T. M. Richardson,

Clamp.

No. 99,477. Patented Feb. 1, 1870.

Witnesses.
E. W. Anderson,
D. D. Kane

Inventor
T. M. Richardson,
Chipman, Hosmer & Co.
Attorneys.

United States Patent Office.

T. M. RICHARDSON, OF STOCKTON, MAINE.

Letters Patent No. 99,477, dated February 1, 1870.

IMPROVEMENT IN FLOORING-SET

The Schedule referred to in these Letters Patent and making part of the same.

To all whom it may concern:

Be it known that I, T. M. RICHARDSON, of Stockton, in the county of Waldo, and State of Maine, have invented a new and valuable Improvement in Deck and Flooring-Set; and I do hereby declare that the following is a full, clear, and exact description of the construction and operation of the same, reference being had to the annexed drawings, making a part of this specification, and to the letters and figures of reference marked thereon.

Figure 1:
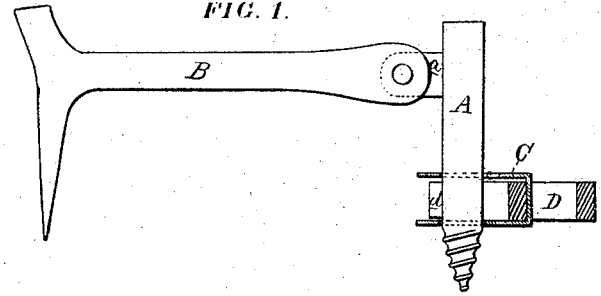

Figure 1 of the drawings is a representation of a central vertical section of my invention.

Figure 2:
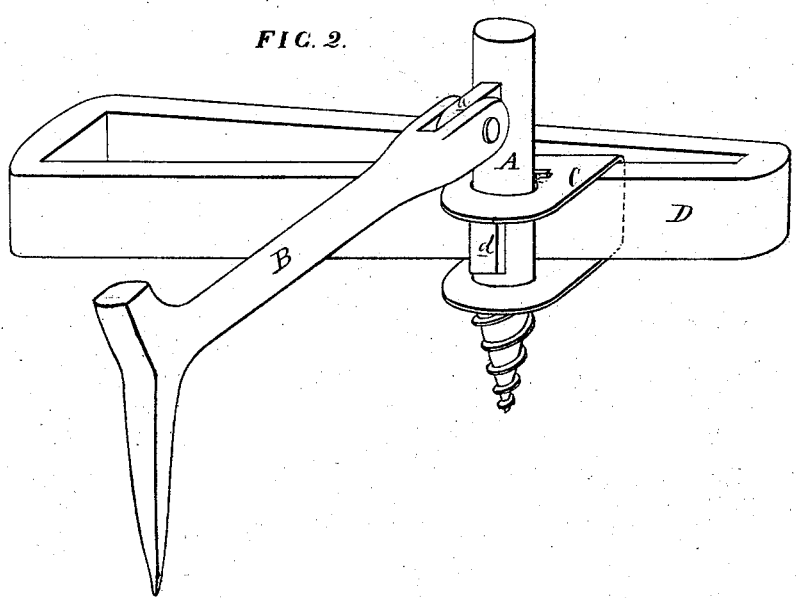

Figure 2 is a perspective view of the same.

My invention has relation to implements for clamping and laying heavy plank upon the hull and deck of a vessel, and other like purposes; and It consists, mainly, in a novel arrangement of devices intended to serve as a valuable auxiliary in prosecuting the labor mentioned.

A, of the drawings, represents a standard, having a screw-thread cut on its lower end, of the form shown.

It has also an ear or flanch, a, to which the dog B is attached by a pivot-pin.

C represents a metallic plate, bent in the form of a staple, and having openings through both ears or flanges, to receive and hold the standard A.

The opening through the upper ear of this plate is cut out in the form shown at c, to admit the cleat d, which is attached to the side of the standard. When the cleat is passed through the same, the standard is turned slightly, by which means the cleat is made to serve as a lock to keep the standard in place.

D, of the drawings, represents a wedge, with its interior portion cut away, and arranged for adjustment in place, by being clasped over one of its sides, by the staple C. When thus clasped, it becomes a part of the apparatus, and is only removable by unlocking and removing the standard.

The dog B is constructed in the usual form, except its head, which is extended upward, as shown, to provide a convenient surface for the use of a hammer in forcing its point into the timber.

It will be observed, that when all the parts are united for duty, they become one instrument, and remain such, until the operator sees fit to separate them by unlocking and removing the standard, whereby the danger of loss of any part, and the delay caused by mislaying any part, are both obviated. Besides, the instrument is always ready for use.

What I claim as my invention, and desire to secure by Letters Patent, is—

The deck and flooring-set, herein described, consisting of the standard A, dog B, staple C, and wedge D, constructed and arranged substantially as specified.

In testimony that I claim the above, I have hereunto subscribed my name, in the presence of two witnesses.

T. M. RICHARDSON.

Witnesses:
S. B. PENDLETON,
DORENDO DICKEY.